US012619770B1

(12) United States Patent
Dixon et al.

(10) Patent No.: US 12,619,770 B1
(45) Date of Patent: May 5, 2026

(54) SYSTEMS AND METHODS FOR GENERATING AND PROVIDING DISINFORMATION TO MITIGATE FRAUD

(71) Applicant: United Services Automobile Association (USAA), San Antonio, TX (US)

(72) Inventors: David Patrick Dixon, Boerne, TX (US); Ashley Raine Philbrick, San Antonio, TX (US); Surender Kumar, Palatine, IL (US); Megan Sarah Jennings, San Antonio, TX (US); Salvador Adrian Bretado, San Antonio, TX (US); Brian Tougas, Spring Branch, TX (US); Arthur Quentin Smith, Fredericksburg, TX (US); Jennifer Anne Scamardo, Frisco, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 304 days.

(21) Appl. No.: 18/227,452

(22) Filed: Jul. 28, 2023

Related U.S. Application Data

(60) Provisional application No. 63/393,480, filed on Jul. 29, 2022.

(51) Int. Cl.
| | |
|---|---|
| *G06F 21/62* | (2013.01) |
| *G06N 3/044* | (2023.01) |
| *G06Q 50/26* | (2012.01) |

(52) U.S. Cl.
CPC ...... *G06F 21/6245* (2013.01); *G06F 21/6227* (2013.01); *G06N 3/044* (2023.01); *G06Q 50/265* (2013.01)

(58) Field of Classification Search
USPC ............................................. 726/29
See application file for complete search history.

(56) References Cited

U.S. PATENT DOCUMENTS

| | | | |
|---|---|---|---|
| 2009/0210492 A1* | 8/2009 | Guislain | H04L 63/102 709/204 |
| 2019/0166159 A1* | 5/2019 | Avrahami | H04L 63/1483 |
| 2023/0106136 A1* | 4/2023 | Kim | G06N 3/045 706/20 |
| 2023/0316284 A1* | 10/2023 | Kramme | G06Q 20/34 705/44 |
| 2024/0205301 A1* | 6/2024 | Presley | G06F 21/606 |

* cited by examiner

*Primary Examiner* — Sanchit K Sarker
(74) *Attorney, Agent, or Firm* — Fletcher Yoder, PC

(57) ABSTRACT

A computing system includes storage that includes a customer database, a trained artificial intelligence (AI) component, and a disinformation processing module and processing circuitry configured to execute stored instructions to perform actions including providing customer information stored in the customer database as input to the trained AI component, receiving potential customer disinformation as output from the trained AI component, analyzing and modifying the potential customer disinformation using the disinformation processing module to yield customer disinformation, and providing a portion of the customer disinformation to an untrusted client device, a malicious website, a third party service, or any combination thereof.

19 Claims, 5 Drawing Sheets

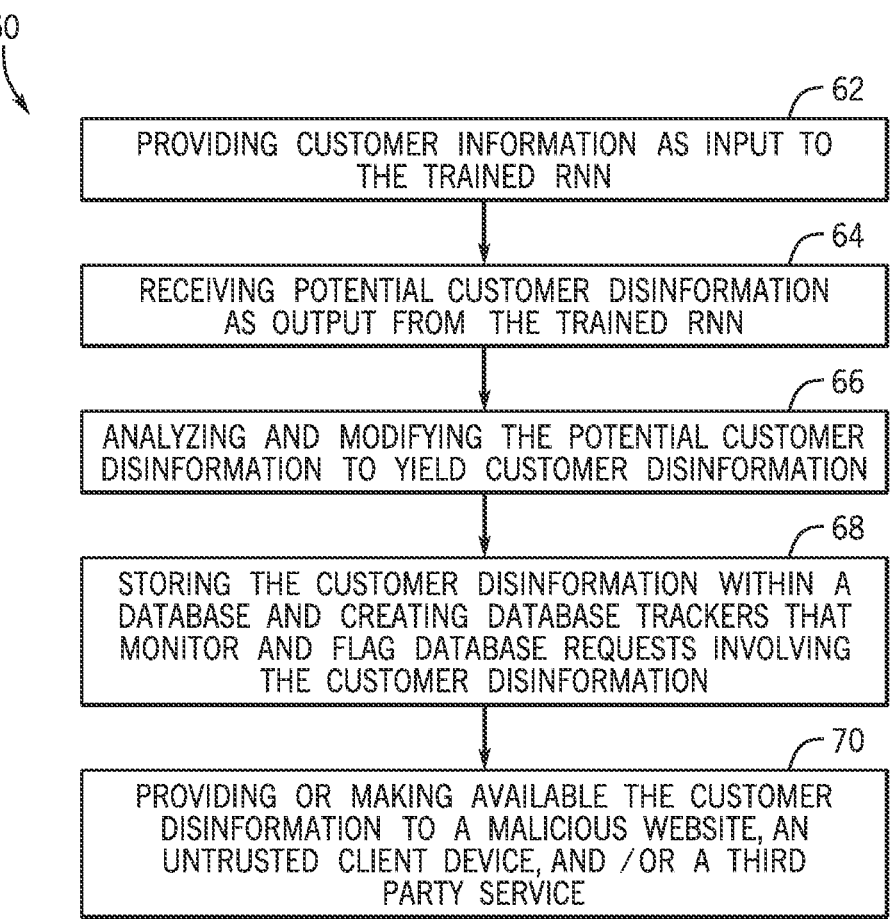

60

62

PROVIDING CUSTOMER INFORMATION AS INPUT TO
THE TRAINED RNN

64

RECEIVING POTENTIAL CUSTOMER DISINFORMATION
AS OUTPUT FROM THE TRAINED RNN

66

ANALYZING AND MODIFYING THE POTENTIAL CUSTOMER
DISINFORMATION TO YIELD CUSTOMER DISINFORMATION

68

STORING THE CUSTOMER DISINFORMATION WITHIN A
DATABASE AND CREATING DATABASE TRACKERS THAT
MONITOR AND FLAG DATABASE REQUESTS INVOLVING
THE CUSTOMER DISINFORMATION

70

PROVIDING OR MAKING AVAILABLE THE CUSTOMER
DISINFORMATION TO A MALICIOUS WEBSITE, AN
UNTRUSTED CLIENT DEVICE, AND / OR A THIRD
PARTY SERVICE

FIG. 3

| FIRST NAME | MIDDLE INITIAL | LAST NAME | SUFFIX | TELEPHONE | DL# | EMAIL ADDRESS | DISINFORMATION FLAG |
|---|---|---|---|---|---|---|---|
| DAVID | C. | SMITH | JR. | 919-293-1100 | 10394435 | david.smith@mail.com | 0 |
| JOHN | M. | MOON | | 818-244-1020 | 19485381 | john.moon@email.com | 1 |
| MICHAEL | Q. | JONES | SR. | 616-244-2034 | 12439943 | mjones@myemail.com | 0 |
| JENNIFER | Y. | KATE | | 505-113-2323 | 17319234 | JYK_113@webmail.com | 1 |
| MANDY | K. | ZIMMER | | 414-223-1243 | 18954319 | KMZ_1998@email.com | 1 |
| SALLY | K. | JENNINGS | | 505-203-1214 | 16734969 | Sally_K_2020@mymail.com | 0 |

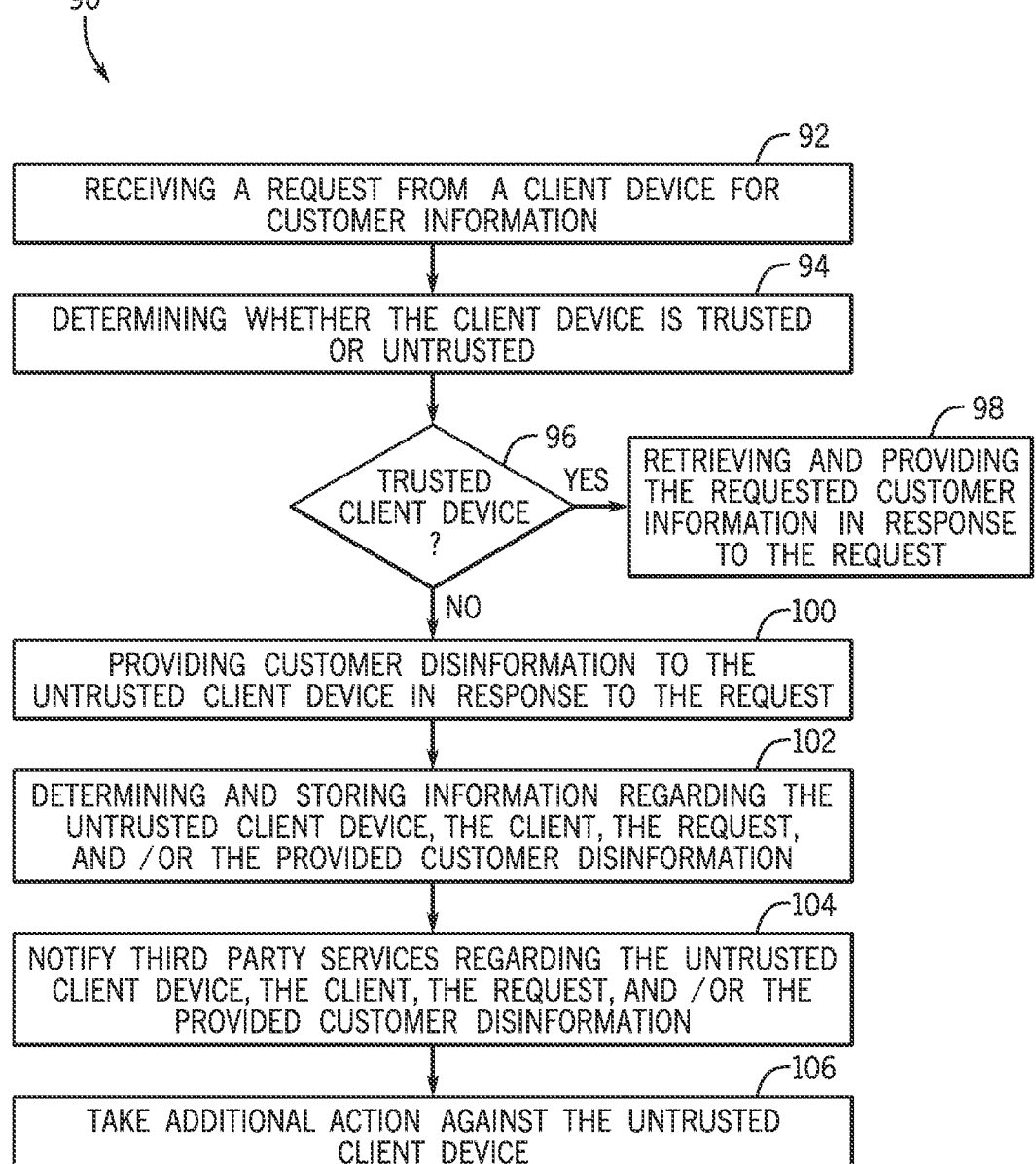

90

92
RECEIVING A REQUEST FROM A CLIENT DEVICE FOR CUSTOMER INFORMATION

94
DETERMINING WHETHER THE CLIENT DEVICE IS TRUSTED OR UNTRUSTED

96
TRUSTED CLIENT DEVICE ?

YES

98
RETRIEVING AND PROVIDING THE REQUESTED CUSTOMER INFORMATION IN RESPONSE TO THE REQUEST

NO

100
PROVIDING CUSTOMER DISINFORMATION TO THE UNTRUSTED CLIENT DEVICE IN RESPONSE TO THE REQUEST

102
DETERMINING AND STORING INFORMATION REGARDING THE UNTRUSTED CLIENT DEVICE, THE CLIENT, THE REQUEST, AND /OR THE PROVIDED CUSTOMER DISINFORMATION

104
NOTIFY THIRD PARTY SERVICES REGARDING THE UNTRUSTED CLIENT DEVICE, THE CLIENT, THE REQUEST, AND /OR THE PROVIDED CUSTOMER DISINFORMATION

106
TAKE ADDITIONAL ACTION AGAINST THE UNTRUSTED CLIENT DEVICE

FIG. 5

SYSTEMS AND METHODS FOR GENERATING AND PROVIDING DISINFORMATION TO MITIGATE FRAUD

CROSS-REFERENCE TO RELATED APPLICATIONS

This application claims priority from and the benefit of U.S. Provisional Application No. 63/393,480, entitled "SYSTEMS AND METHODS FOR GENERATING AND PROVIDING DISINFORMATION TO MITIGATE FRAUD," filed Jul. 29, 2022, which is hereby incorporated by reference in its entirety for all purposes.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Organizations, such as businesses, educational entities, and governmental entities, often store various data to enable operations. For example, this data may include personal information (e.g., names, birthdates, contact information) of people (e.g., customers, users, students, citizens) associated with the organization. It is generally desirable for these organizations to store, retrieve, and use this personal information to provide goods or services to the people associated with the organization. However, it is presently recognized that such data can be a lucrative target for malicious actors (e.g., hackers), who can leverage this personal information to gain additional attack vectors against the organization and/or the people associated with the organization, or may simply sell this information (e.g., on the "dark web") to be used by other malicious actors for nefarious or illicit purposes. For example, malicious actors may use this illicitly accessed information to conduct identity theft, credit card fraud, insurance fraud, and to gain unauthorized access to accounts or services associated with the organization or the customers and employees associated with the organization.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a computing system includes storage that includes a customer database, a trained artificial intelligence (AI) component, and a disinformation processing module and processing circuitry configured to execute stored instructions to perform actions including providing customer information stored in the customer database as input to the trained AI component, receiving potential customer disinformation as output from the trained AI component, analyzing and modifying the potential customer disinformation using the disinformation processing module to yield customer disinformation, and providing a portion of the customer disinformation to an untrusted client device, a malicious website, a third party service, or any combination thereof.

In another embodiment, a computer-implemented method includes providing customer information stored in a customer database as input to a trained artificial intelligence (AI) component, receiving potential customer disinformation as output from the trained AI component, analyzing and modifying the potential customer disinformation using a disinformation processing module to yield customer disinformation, and providing a portion of the customer disinformation to an untrusted client device, a malicious website, a third party service, or any combination thereof.

In another embodiment, a non-transitory, computer-readable medium includes instructions stored thereon that, when executed by processing circuitry, cause the processing circuitry to provide customer information stored in a customer database as input to a trained artificial intelligence (AI) component, receive potential customer disinformation as output from the trained AI component, analyze and modify the potential customer disinformation using a disinformation processing module to yield customer disinformation, and provide a portion of the customer disinformation to an untrusted client device, a malicious website, a third party service, or any combination thereof.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 3 is a flow diagram of an embodiment of a process whereby the service provider server generates and provides customer disinformation based on customer information, in accordance with the present technique;

FIG. 5 is a flow diagram of an embodiment of a process whereby the service provider server provides customer information to a trusted client device or provides customer disinformation to untrusted client devices, in accordance with the present technique.

DETAILED DESCRIPTION

Figure 1:
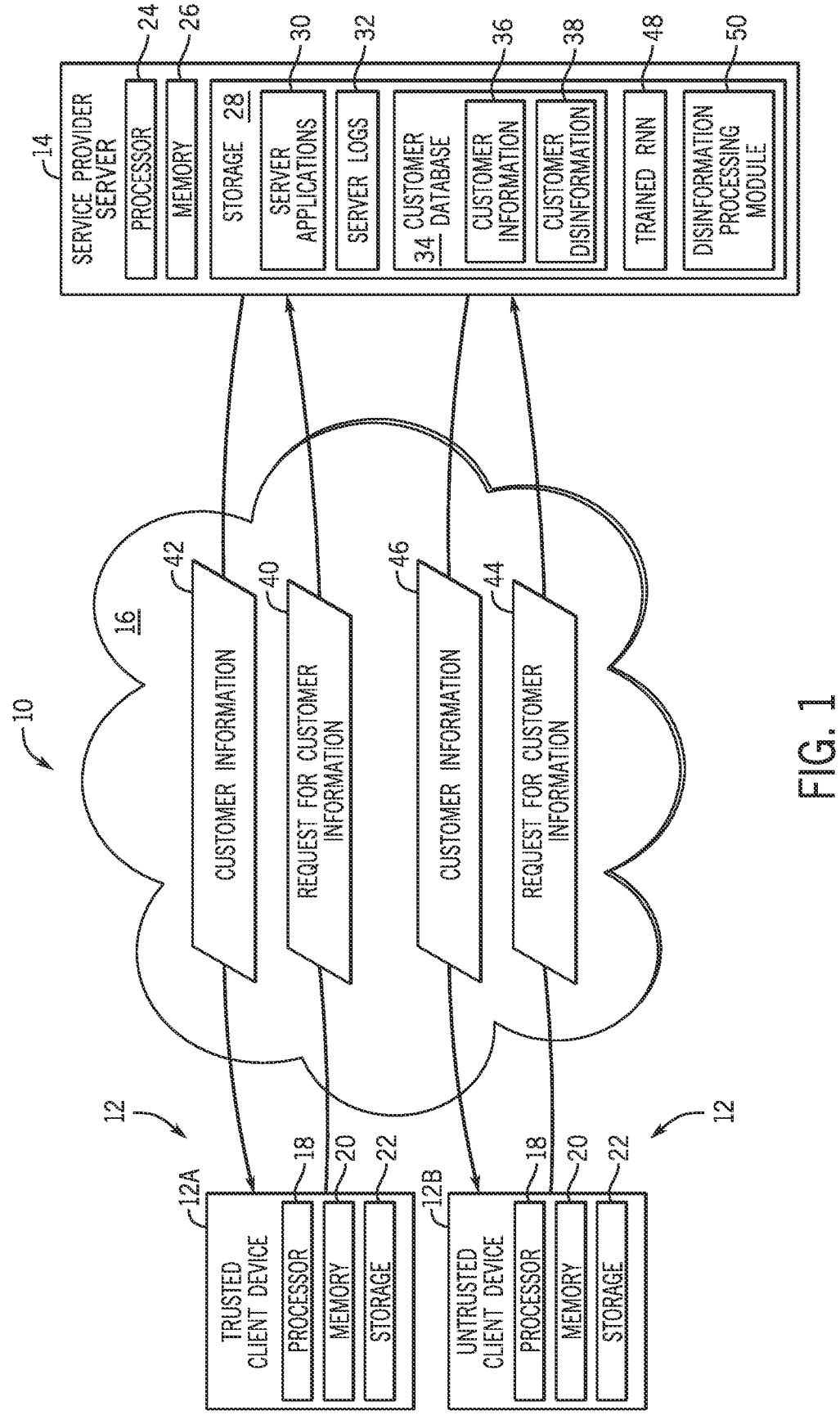
FIG. 1 is schematic diagram of an embodiment of a client-server architecture for providing customer information to trusted client devices and for generating and providing customer disinformation to untrusted client devices, in accordance with the present technique.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure relates generally to a disinformation technique to combat fraud. In particular, present embodiments are directed to systems and methods that leverage artificial intelligence (AI) components to generate credible disinformation from legitimate information stored by an organization. For example, in certain embodiments, the disclosed system generates credible customer disinformation from real customer information, wherein this customer disinformation can be subsequently provided to untrusted devices or malicious websites. For example, prior to the present technique, a data request from an untrusted client device may simply be ignored and/or the untrusted client device may be disconnected or blocked to prevent data loss. However, in accordance with the present technique, the system instead provides disinformation in response to a data request from an untrusted client device, and collects information regarding the untrusted client device and/or the data request that can be used to take further action (e.g., a denial of service (DOS) attack, legal action) against the untrusted client device. In another example, the customer disinformation may be submitted to a malicious website (e.g., a "dark website") for hosting, under the guise that the data represents genuine customer data that was stolen from an organization via unauthorized access (e.g., "hacking"). In another example, the customer disinformation may be provided to other types of websites or applications, such as social media applications and/or services (e.g., email services, TWITTER®, FACEBOOK®, INSTAGRAM®, YOUTUBE®), such that the customer disinformation is accessible to the public to confuse bad actors. In some embodiments, the customer disinformation may be used to create actual accounts (e.g., email accounts, social media accounts), referred to herein as "disinformation accounts", that can further convince bad actors that the acquired customer disinformation is genuine.

The generated disinformation does not include sufficient genuine information to enable fraudulent or criminal activities. In some embodiments, the generated disinformation may be shared with third parties, such as other organizations or law enforcement, such that these entities can determine when someone is attempting to use this disinformation to conduct fraudulent and/or criminal activities (e.g., unauthorized computer account access, identity theft, credit card fraud, insurance fraud). As such, a would-be criminal that utilizes the disinformation will waste resources (e.g., money, time, computing resources) and risk discovery and arrest while unsuccessfully attempting to use the customer disinformation for nefarious activities. Additionally, the reputation of the malicious website that hosts the disinformation will be diminished, as bad actors attempting to purchase legitimate information are themselves "scammed" by the customer disinformation. Furthermore, while previous techniques focus on quickly blocking connections from untrusted devices attempting to illicitly exfiltrate data from the network of a service provider, the present techniques can provide disinformation to convince a malicious actor that a network intrusion is yielding useful and lucrative information, incentivizing the malicious actor to continue their illicit activities while details regarding the malicious actor are collected by the service provider. These details can then be leveraged by the service provider to take further action against the malicious actor, such as submitting the information to appropriate law enforcement to provoke further investigation into the malicious actor, affecting a defensive attack (e.g., a distributed denial-of-service attack [DDOS]) against a computing device, network, or internet service provider (ISP) used by the malicious actor, or other suitable actions. As such, the present disinformation techniques dilute the value of real information available from malicious websites and increase risk and cost for potential bad actors attempting to steal information and/or use stolen information for illicit purposes.

With the foregoing in mind, FIG. 1 is schematic diagram of an embodiment of a client-server architecture 10 in which a service provider (e.g., a banking service provider, an insurance service provider) provides customer information to trusted client devices, and provides customer disinformation to untrusted client devices. As used herein, "customer information" refers to personal information of an actual customer or client, such as names, birthdates, addresses, account information, policy information, and so forth. As used herein, "customer disinformation" refers to information that, while it appears on its face to be customer information, actually includes or consists entirely of generated information that is not true and accurate customer information. It should be appreciated that, while the examples disclosed herein are discussed in the particular context of customer information and customer disinformation, in other embodiments, the present technique can be used to generate and provide other types of disinformation, such as disinformation regarding orders, accounts, policies, projects, employees, and so forth, in accordance with the present techniques.

For the illustrated embodiment, the client-server architecture 10 includes any suitable number of client devices 12 that are each communicatively coupled to a service provider server 14 (also referred to herein as simply "server") via a suitable network 16. In certain embodiments, the client devices 12 may be desktop computers, laptop computers, smart phones, or other suitable computing devices. In certain embodiments, the server 14 may be or include one or more computing devices disposed within a data center or disposed at a location of the service provider. The network 16 may include a wide-area network (WAN), a local-area network (LAN), a virtual private network (VPN), the internet, another suitable wired and/or wireless network, or any suitable combination thereof.

For the illustrated embodiment, the client devices 12 each include at least one processor 18 (e.g., a central processing unit (CPU), a graphic processing unit (GPU), processing circuitry), at least one memory 20 (e.g., random access memory (RAM), read-only memory (ROM)), and at least one storage 22 (e.g., a hard disk drive (HDD), a solid-state disk (SSD), flash memory). The storage 22 of the client devices 12 may store any suitable number of applications and/or software resources that are respectively executed by the processing circuitry 18 to provide desired functionality at the client devices 12. For example, the client devices 12 may store a web browser or a custom client-server application configured to enable the client devices 12 to request and receive information from the server 14.

More specifically, for the illustrated embodiment, the client devices 12 include a trusted client device 12A and an untrusted client device 12B. As used herein, a "trusted client device" or "trusted client" refers to a device or user that is properly authorized by the service provider to access customer information that is hosted by the server 14, while an "untrusted client device" or "untrusted client" refers to a device or user that is not authorized by the service provider to access customer information that is hosted by the server 14. In some embodiments, the server 14 may authenticate the client device 12 based on authentication credentials (e.g., username, password, personal identifier number (PIN)) provided by the user of the client devices 12 or stored on the client devices 12 (e.g., encryption keys, authentication certificates). In certain embodiments, the server 14 may receive authentication credentials that are incorrect, incomplete, or have been compromised. In certain cases, the server 14 may revoke the trust with the client device, rendering it untrusted thereafter. For example, the server 14 may revoke the trust with a particular client device in response to receiving an indication that a client device has been lost or stolen, in response to detecting authentication credentials of the user of the client device on a malicious website (e.g., the "dark web"), in response to a customer report of a lost device, in response to a customer report of suspicious activity, in response to detecting that a client device is attempting to access resources that are beyond those authorized for the user or client device, and so forth.

For the embodiment illustrated in FIG. 1, the server 14 includes at least one processor 24 (e.g., a CPU, a GPU, processing circuitry), at least one memory 26 (e.g., RAM, ROM), and at least one storage 28 (e.g., a HDD, a SSD, flash memory). The storage 28 of the server 14 may store a number of server applications 30, including but not limited to, web serving applications, user interface applications, cloud-based applications, e-commerce applications, account management applications, and so forth, which are executed by the processing circuitry 24 to provide desired functionality to the clients via the client devices 12. The storage 28 of the server 14 also includes server logs 32, which store information relating to the activities of the server applications 30 during operation. For example, the server logs 32 may include logs from a web serving application, and may indicate when a hosted web page or media content was accessed, an identity of the client device 12 and/or client that requested the web page, data requests and responses, an amount of time between each web request, and so forth.

For the embodiment illustrated in FIG. 1, the storage 28 of the server 14 also includes a customer database 34 that stores customer information 36 related to customers or clients of the service provider. This customer information 36 may include, for example, personal information (e.g., names, addresses, identification information), client account data, such as data related to accounts, balances, limits, transaction volume, a duration of time the customer has had a relationship with the service provider, particular goods and/or services purchased from the service provider by the client, and so forth. In certain embodiments, the customer database 34 may be configured to also store customer disinformation 38 that is generated from the customer information 36, as discussed below. For example, in response to a request 40 for customer information 36 from the trusted client device 12A, a server application hosted by the server 14 may retrieve and provide the requested customer information 42. However, in response to a request 44 for customer information 36 from the untrusted client device 12B, the server application hosted by the server 14 may retrieve and provide customer disinformation 46. In certain embodiments, rather than store the customer disinformation 38 within the customer database 34, the server 14 may generate customer disinformation 38 from the customer information for immediate use to be provided in response to the request 44 for customer information from the untrusted client device 12B.

For the embodiment illustrated in FIG. 1, the storage 28 of the server 14 includes an artificial intelligence (AI) component, such as a trained recurrent neural network (RNN) 48, a Graph Neural Network (GNN), a combination thereof (RGNN), a Long Short-Term Memory (LSTM) Neural Network, or other suitable artificial neural network. For the illustrated example, the trained RNN 48 is particularly trained to automatically generate the customer disinformation 38 from the customer information 36 stored in the customer database 34. In particular, the trained RNN 48 is trained using the customer information 36 to produce credible customer disinformation 38 that appears to be legitimate customer information 36. The trained RNN 48 includes a number of internal weight values that are iteratively adjusted during training until, in response to customer information input, the trained RNN 48 generates credible customer disinformation 38 that is similar in structure and form to the existing customer information 36 in the customer database 34.

Additionally, the storage 28 of the server 14 includes a disinformation processing module 50 that stores instructions executable by the processing circuitry 24 to enable the server 14 to analyze and verify that the customer disinformation 38 generated by the trained RNN 48 does not include actual customer information 36 that would be enabling for illicit activity. That is, in certain cases, it is presently recognized that the trained RNN 48 may inadvertently generate customer disinformation 38 that coincidentally corresponds to actual customer information 36. This likelihood may increase because the RNN 48 may be trained to incorporate aspects of correct data to provide passable disinformation. As such, the disinformation processing module 50 is configured to ensure that the customer disinformation 38 generated by the server 14 does not inadvertently include customer information 36 that could enable illicit activity. This includes analyzing data to make sure portions cannot be combined to identify correct information. In some embodiments, the disinformation processing module 50 may also apply one or more stored rules to modify one or more fields of the customer disinformation 38 generated by the trained RNN 48 to ensure that these fields comport to the format and style expected for each of these fields in the customer disinformation 38.

Figure 2:
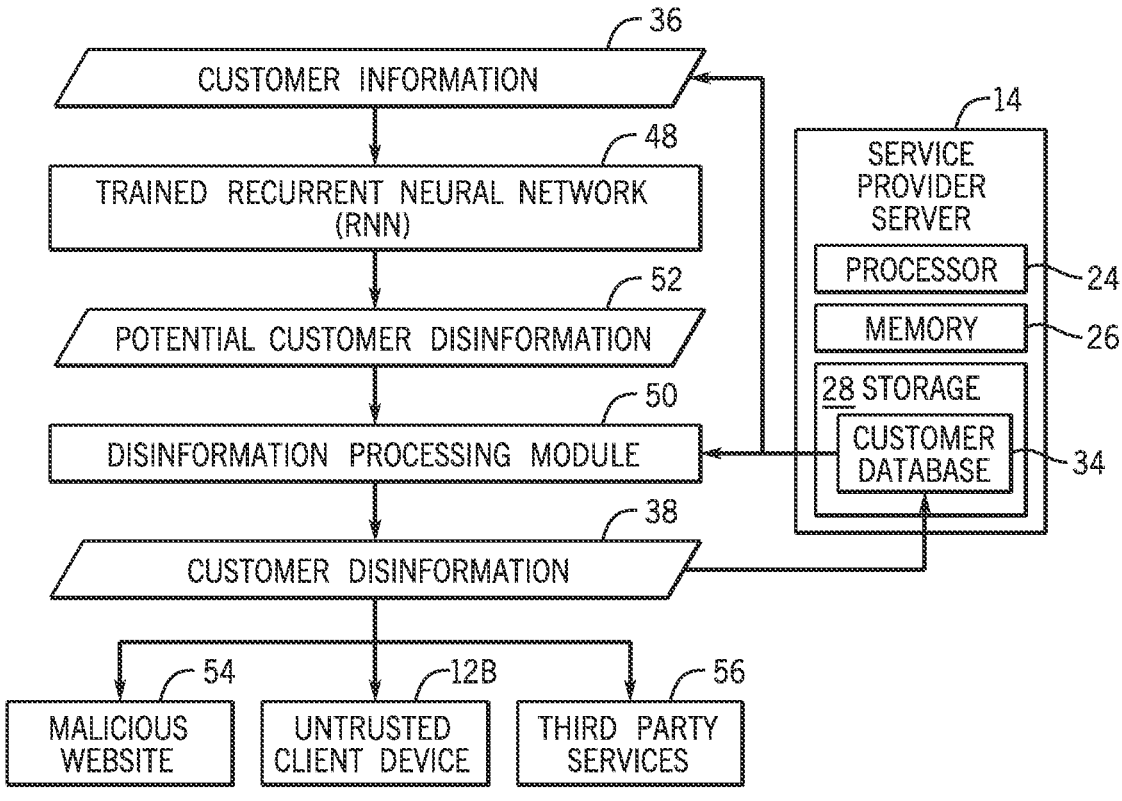
FIG. 2 is a schematic diagram of a trained recurrent neural network (RNN) and a disinformation processing module of a service provider server generating customer disinformation based on customer information, in accordance with the present technique.

FIG. 2 is a schematic diagram of the trained RNN 48 and the disinformation processing module 50 of the server 14 generating customer disinformation 38 based on customer information 36, in accordance with the present technique. For the illustrated embodiment, the processing circuitry 24 of the server 14 executes instructions and/or models stored in the memory 26 and/or storage 28 to affect the generation of the customer disinformation 38. As noted above, for the illustrated embodiment, the storage 28 of the server 14 includes a customer database 34 that stores customer information 36. As illustrated in FIG. 2, the customer information 36 is provided as input to the trained RNN 48 or another suitable AI component, and in response, the trained RNN 48 generates potential customer disinformation 52.

For the embodiment illustrated in FIG. 2, the potential customer disinformation 52 is provided as input to the disinformation processing module 50, which analyses and/or modifies the potential customer disinformation 52 output by the trained RNN 48 to yield the customer disinformation 38. For example, in certain embodiments, the disinformation processing module 50 may access the customer information 36 stored in the customer database 34, and may compare the customer information 36 to the potential customer disinformation 52. In certain embodiments, the disinformation processing module 50 may discard or modify any of the potential customer disinformation 52 that coincidentally matches, or too nearly matches using guidelines ranging from simple to complex (e.g., 95%+ match between actual customer information 36 and the potential disinformation 52), the customer information 36 stored in the customer database 34. For example, in a situation in which the customer information 36 includes a first name field, a last name field, and a driver's license number, the disinformation processing module 50 may allow certain fields of the customer disinformation 38 (e.g., the first name field) to have values that are present within the customer information 36 of the customer database 34, but may not allow other fields (e.g., the last name field, the driver's license number) to have values that are present within the customer information 36. In some embodiments, the disinformation processing module 50 may include rules that define credible values and/or ranges of values for particular information. For example, in a situation in which a driver's license number must begin with a particular digit (e.g., "1"), the disinformation processing module 50 may discard or modify driver's license numbers output by the trained RNN 48 as potential customer disinformation 52, such that the customer disinformation 38 conforms to the desired format and appears legitimate. In another example, the disinformation processing module 50 may discard or modify a generated email address within the potential customer disinformation 52 to ensure that the domain of the email address is a legitimate internet domain having a mail server. In another example, the disinformation processing module 50 may discard or modify a generated email address determined to be a legitimate email address belonging to someone else. In some embodiments, email addresses may be established (and accessible by the entity generating the disinformation) and stored in a database for submitting as disinformation.

As illustrated in FIG. 2, the server 14 may use the customer disinformation 38 in a number of different ways. In some embodiments, the customer disinformation 38 may be stored in the customer database 34, from which it can be retrieved and provided in response to a request from an untrusted client device 12B. In some embodiments, the customer disinformation 38 may be generated for immediate use and provided in response to a request from an untrusted client device 12B. In some embodiments, the customer disinformation 38 may be automatically or manually uploaded to a malicious website 54 that hosts, or purports to host, illicitly accessed data (e.g., hacked information) for nefarious purposes. Additionally or alternatively, the customer disinformation 38 may be automatically or manually uploaded to one or more third party services 56 to monitor for the appearance of the customer disinformation 38. For example, the third-party services 56 may include law enforcement services, government or regulatory agencies, credit card fraud prevention services, data monitoring services, affiliated companies, and so forth. Once the customer disinformation 38 has been received by these third-party services 56, these services may track the attempted use of customer disinformation 38 to attempt to illicitly apply for services, purchase goods, access data, transfer assets, and so forth. It may be appreciated that this enables enhanced tracking of illicit activities by the malicious actor from the acquisition of the customer disinformation 38 to the attempted use of the customer disinformation 38, which can be used to take further actions (e.g., legal actions, defensive actions) against the malicious actor.

In certain embodiments, the customer disinformation 38 may be used to create disinformation accounts on certain third-party services 56, such as email services (e.g., GMAIL, HOTMAIL) and/or social media services (e.g., TWITTER, FACEBOOK, INSTAGRAM, YOUTUBE). For example, it is presently recognized that a malicious actor may access certain third-party services 56 (e.g., using data analytic systems) to attempt to validate exfiltrated data as genuine. As such, in certain embodiments, the server 14 may automatically create disinformation accounts for fictitious customers on these third-party services 56 to make these customers appear to be legitimate, actual customers.

In some embodiments, the server 14 may also provide the customer disinformation 38 to certain third-party services 56, such as email services (e.g., GMAIL®, HOTMAIL®) and/or social media services (e.g., TWITTER®, FACEBOOK®, INSTAGRAM®, YOUTUBE®) to provide a "smoke-screen" effect to shield actual customers from hacking at the third-party services 56. For example, in certain embodiments, the trained RNN 48 and the disinformation processing module 50 may be configured to generate customer disinformation 38 that is intentionally similar (e.g., contains a threshold amount of similarity) to actual customer information 36 (e.g., 95% similar, 90% similar, 80% similar). By way of specific example, a genuine customer in the customer information 36 may have an email address "GWashington99@gmail.com". Using this information, the trained RNN 48 and the disinformation processing module 50 may cooperate, as discussed above, to generate similar fictitious email address values in the customer disinformation 38, such as "GeorgeWashington@gmail.com", "George99Washington@gmail.com", "GWash1999@gmail.com", and so forth. In some embodiments, using this customer disinformation 38, the server 14 may create email accounts for these generated email addresses at a third-party service (e.g., GMAIL). Additionally, in certain embodiments, the server 14 may generate and send email messages to and/or from the created email accounts to provide further indications to the bad actor that the created email accounts are genuine and belong to the customer. In certain cases, the server 14 may automatically delete these disinformation accounts after a predetermined amount of time. As such, a bad actor that has gained access to this customer disinformation 38 will not be able to discern the actual email address of the customer, enhancing the security of the customer, while the bad actor may waste time and resources attempting to access the customer disinformation accounts.

FIG. 3 is a flow diagram of an embodiment of a process 60 whereby the server 14 generates and provides the customer disinformation 38 based on the customer information 36 stored in the customer database 34. The process 60 may be implemented using computer-readable instructions stored in the at least one memory 26 and executed by the processing circuitry 24 of the server 14. The process 60 is discussed with reference to elements illustrated in FIGS. 1 and 2. For the illustrated embodiment, the process 60 begins with the processing circuitry 24 providing (block 62) at least a portion of the customer information 36 stored in the customer database 34 as input to the trained RNN 48. In response, the processing circuitry 24 receives (block 64), as output from the trained RNN 48, potential customer disinformation 52.

For the embodiment illustrated in FIG. 3, the process 60 continues with the processing circuitry 24 of the server 14 analyzing and modifying (block 66) the potential customer disinformation 52 generated by the trained RNN 48 to yield the customer disinformation 38. As discussed above, in certain embodiments, the processing circuitry 24 of the server 14 may execute the disinformation processing module 50 to review the potential customer disinformation 52 and selectively discard and/or modify particular values to yield the customer disinformation 38. In particular, the disinformation processing module 50 ensures that the customer disinformation 38 lacks sufficient genuine customer information 36 that could be used to perform illicit activities, and ensures that the customer disinformation 38 comports to any structural or formatting requirements of each field to appear credible to a malicious actor.

For the embodiment illustrated in FIG. 3, the process 60 continues with the processing circuitry 24 of the server 14 storing (block 68) the customer disinformation 38 within a suitable database for later access. In some embodiments, the customer disinformation 38 may be stored in the same database as the customer information 36 (e.g., the customer database 34), while in other embodiments, the customer disinformation 38 may be stored in a separate database. In some embodiments, the processing circuitry 24 may create, within the customer database 34, database trackers that monitor and track database requests that result in providing the customer disinformation 38. For example, based on the actions of these database trackers, the server logs 32 of the server 14 may include details indicating which customer disinformation 38 was provided to which untrusted client devices, as well as additional details regarding the client device and/or the client that requested and received the customer disinformation 38. For the embodiment illustrated in FIG. 3, the process 60 continues with the processing circuitry 24 of the server 14 providing or making available (block 70) the customer disinformation 38 to a malicious website, an untrusted client device, and/or a third party service, as discussed above. The logic used by the function represented in block 70 can use various methods for selecting disinformation from the customer disinformation 38 of the database 34 including, randomly, sequentially, based on information associated with the untrusted device 12B, based on trends in hacker activity, based on the frequency of requests by untrusted device 12B, based on trends unique to the organization, and so forth.

Figure 4:
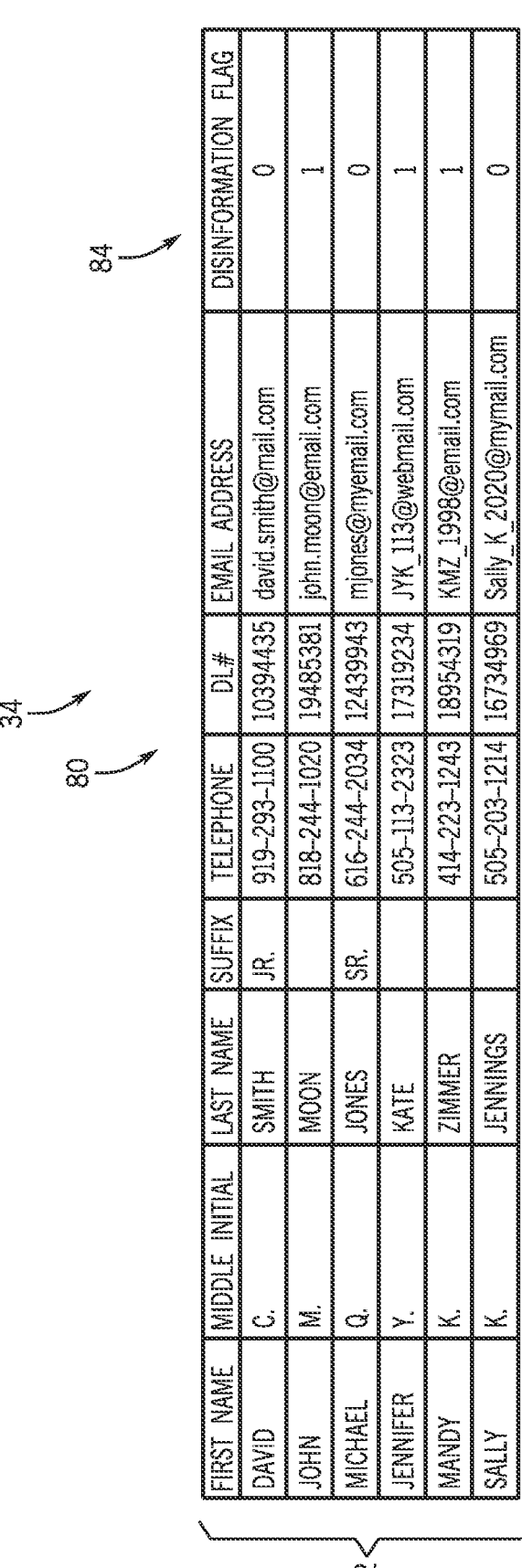
FIG. 4 is an example embodiment of a database table that stores customer information along with generated customer disinformation, in accordance with the present technique.

FIG. 4 is an example embodiment of a database table 80 of the customer database 34 that stores customer information 36 along with generated customer disinformation 38. For the illustrated database table 80, there are a number of entries or rows 82, some of which correspond to customer information 36, while the others correspond to customer disinformation 38 generated by the server 14 from the customer information 36. Each entry includes a number of different example field (table columns) values, including first name, middle initial, last name, suffix, telephone, driver's license number, and email address fields.

For the illustrated example of FIG. 4, the database table 80 also includes a disinformation flag field 84, which stores a Boolean value (e.g., a binary bit) indicating whether or not each of the entries 82 represents customer disinformation 38. Other methods for flagging a field known to people skilled in the art can be used in addition to, or as an alternative to, a Boolean value. In certain embodiments, the customer database 34 and the database table 80 may be configured to not allow the information from the disinformation flag field 84 to be directly accessed or returned in response to a data request or query of the database table 80. Rather, the database table 80 may be configured to hide or restrict access to the disinformation flag field 84, such that typically only the database server 14 has access to internally perform queries or apply query conditions that access or utilize the disinformation flag field 84. For example, in response to a data request from the trusted client device 12A, the processing circuitry 24 of the server 14 may query the database table 80 to respond to the data request, wherein the customer database 34 internally restricts the query results to entries in which the disinformation flag field 84 has a value of false or zero. In response to a data request from the untrusted client device 12B, the processing circuitry 24 of the server 14 may query the database table 80 to respond to the data request, wherein the customer database 34 internally restricts the results of the query to entries in which the disinformation flag field 84 has a value of true or one. Since the disinformation flag field 84 may be heavily restricted within the database 34 for such embodiments, even if the database table 80 is compromised in its entirety except for the hidden disinformation flag values 84 that are inaccessible, the database table 80 will include a mixture of customer information 36 and customer disinformation 38 that will diminish the value of the compromised data set, while the aforementioned third party services 56 may enhance detection of the customer disinformation 38 when subsequently used by a malicious actor. It should be appreciated that the present technique is not limited to relational databases. For example, in some embodiments, the customer database 34 may be a graph database that stores the customer information 36 together with the customer disinformation 38, and the frequency of queries by trusted client devices and untrusted client devices may be tracked by the graph database.

FIG. 5 is a flow diagram of an embodiment of a process 90 whereby the server 14 provides customer information 36 to the trusted client device 12A or provides customer disinformation 38 to the untrusted client device 12B. The process 90 may be implemented using computer-readable instructions stored in the at least one memory 26 and executed by the processing circuitry 24 of the server 14. The process 90 is discussed with reference to elements illustrated in FIGS. 1 and 2. For the illustrated embodiment, the process 90 begins with the processing circuitry 24 receiving (block 92) a request from a client device for customer information 36. The processing circuitry 24 then determines (block 94)

whether the client device is a trusted client device 12A or an untrusted client device 12B. For example, as discussed above, the processing circuitry 24 of the server 14 may determine that the client device 12 is the trusted client device 12A in response to receiving one or more suitable authentication credentials of the client device or the client. The server 14 may determine that the client device 12 is the untrusted client device 12B in response to failing to receive at least one authentication credential, or in response to determining that the received authentication credentials have been reported as compromised. In response to determining that the client device 12 is the trusted client device 12A in decision block 96, the processing circuitry 24 of the server 14 may retrieve and provide (block 98) the requested customer information 36 in response to the request.

For the embodiment illustrated in FIG. 5, when the processing circuitry 24 of the server 14 determines that the client device 12 is the untrusted client device 12B, the process 90 continues with the processing circuitry 24 of the server 14 providing (block 100) customer disinformation 46 to the untrusted client device 12B in response to the request. As noted, in some embodiments, the processing circuitry 24 may select and retrieve previously generated customer disinformation 38 from the customer database 34, while in other embodiments, the processing circuitry 24 may generate this customer disinformation "on the fly" (e.g., in real-time or near real-time) to be provided to the untrusted client device 12B in response to the request. In some embodiments, the processing circuitry 24 may select customer disinformation 38 from the customer database 34 in different manners, such as randomly, sequentially, based on information associated with the untrusted device 12B, based on trends in hacker activity, based on the frequency of requests by untrusted device 12B, based on trends unique to the organization, and so forth. For example, when the same untrusted client device or client requests information for one or more customers multiple times, the processing circuitry 24 may ensure that the same customer disinformation 38 is consistently provided in response to each request.

For the embodiment illustrated in FIG. 5, the process 90 continues with the processing circuitry 24 determining and storing (block 102) information regarding the untrusted client device 12B, the client using the untrusted client device 12B, the request 44 for customer information, and/or the provided customer disinformation 46. For example, in certain embodiments, the server 14 may create entries in the server logs 32 indicating information regarding the untrusted client device (e.g., an internet protocol (IP) address, a media access control (MAC) address, timestamp of the request, packet routing details, hardware or software information, location), information regarding the user or client (e.g., authentication credentials, account type or role, location), information regarding the requested data (e.g., database tables, query conditions), and/or the customer disinformation 38 that was provided to the untrusted client device 12B in response to the request. It may be appreciated that the collected information may include any information that could be useful in identifying or locating the untrusted client device 12B, identifying or locating the client, communicating with the client for taking any preventive measures, taking actions against the untrusted client device, and/or determining the customer information was being sought by the untrusted client device 12B, which may provide indications of plans or motives of the malicious actor requesting the information.

For the embodiment illustrated in FIG. 5, the process 90 continues with the processing circuitry 24 notifying (block

104) one or more third party services 56 of details regarding the untrusted client device 12B, the client using the untrusted client device, the request 44 for customer information, and/or the provided customer disinformation 46. For example, the processing circuitry 24 of the server 14 may communicate with a server of a law enforcement agency to report details of the potential intrusion into the network of the service provider to enable the law enforcement agency to better investigate the illicit activity with a greater chance of success. These details may further include the customer disinformation 46 provided to the untrusted client device 12B in response to the request 44, such that the third party services 56 can monitor for the use of this customer disinformation for illicit purposes. Additionally, in certain embodiments, the processing circuitry 24 of the server 14 may take additional actions (block 106) against the untrusted client device, such as performing or orchestrating a DDOS attack against the untrusted client device, a network of the untrusted client device, or an internet service provider (ISP) of the untrusted client device. As a result of these additional actions, the operations of the untrusted client device and/or an entity operating the untrusted client device may be desirably impaired or interrupted.

While only certain features of the invention have been illustrated and described herein, many modifications and changes will occur to those skilled in the art. It is, therefore, to be understood that the appended claims are intended to cover all such modifications and changes as fall within the true spirit of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A computing system, comprising:

storage that includes a customer database, a trained artificial intelligence (AI) component, and instructions; and a processor system including at least one processor, wherein the processor system is configured to execute the instructions to perform actions comprising:

providing customer information stored in the customer database as input to the trained AI component;

receiving potential customer disinformation as output from the trained AI component;

analyzing and modifying the potential customer disinformation to yield customer disinformation by comparing the potential customer disinformation to the customer information stored in the customer database and modifying one or more fields of the potential customer disinformation based on the comparison to generate the customer disinformation; and providing a portion of the customer disinformation to an untrusted client device, a malicious website, a third party service, or any combination thereof.

2. The computing system of claim 1, wherein the processor system is configured to execute the instructions to perform actions comprising:

storing the customer disinformation along with the customer information in a database table of the customer database.

3. The computing system of claim 2, wherein each entry in the database table includes a respective disinformation flag field value that indicates whether the entry corresponds to the customer information or the customer disinformation.

4. The computing system of claim 3, wherein the customer database is configured to block or prevent external queries from accessing the respective disinformation flag field value of each entry in the database table and is configured to only allow internal queries to access the respective disinformation flag field value of each entry in the database table.

5. The computing system of claim 1, wherein, to provide the portion of the customer disinformation to the untrusted client device, the processor system is configured to execute the instructions to perform actions comprising:

receiving, from a communicatively coupled client device, a request for at least a portion of the customer information stored in the customer database;

determining that the client device is the untrusted client device; and providing the portion of the customer disinformation to the untrusted client device in response to the request.

6. The computing system of claim 5, wherein, to provide the portion of the customer disinformation to the untrusted client device, the processor system is configured to execute the instructions to perform actions comprising:

determining and storing details regarding the untrusted client device, the request, the customer disinformation, or any combination thereof; and notifying the third party service of the details regarding the untrusted client device, the request, the customer disinformation, or any combination thereof.

7. The computing system of claim 5, wherein, to determine that the client device is the untrusted client device, the processor system is configured to execute the instructions to perform actions comprising:

receiving authentication credentials from the client device, wherein the authentication credentials are incorrect, incomplete, or have been compromised.

8. The computing system of claim 1, wherein the third party service comprises law enforcement services, government or regulatory agencies, credit card fraud prevention services, data monitoring services, affiliated companies, or a combination thereof.

9. The computing system of claim 1, wherein, to analyze and modify the potential customer disinformation, the processor system is configured to execute the instructions to perform actions comprising:

applying one or more rules of the instructions to the potential customer disinformation that selectively modify the one or more fields of the potential customer disinformation to conform to an expected style or format associated with the one or more fields.

10. The computing system of claim 1, wherein the customer information corresponds to personal information of an actual customer, and the customer disinformation corresponds to generated information that is not true or accurate information associated with the actual customer.

11. A computer-implemented method, comprising:

providing, via a processor system including at least one processor, customer information stored in a customer database as input to a trained artificial intelligence (AI) component;

receiving, via the processor system, potential customer disinformation as output from the trained AI component;

analyzing and modifying, via the processor system, the potential customer disinformation to yield customer disinformation; and providing a portion of the customer disinformation to an untrusted client device, a malicious website, a third party service, or any combination thereof based on:

receiving, via the processor system and from a communicatively coupled client device, a request for at least a portion of the customer information stored in the customer database;

determining, via the processor system, that the communicatively coupled client device is the untrusted client device; and providing, via the processor system, the portion of the customer disinformation to the untrusted client device in response to the request.

12. The computer-implemented method of claim 11, comprising:

storing the customer disinformation along with the customer information in a database table of the customer database.

13. The computer-implemented method of claim 12, wherein each entry in the database table includes a respective disinformation flag field value that indicates whether the entry corresponds to the customer information or the customer disinformation, and wherein the customer database is configured to block or prevent external queries from accessing the respective disinformation flag field value of each of the entries in the database table and configured to only allow internal queries to access the respective disinformation flag field value of each of the entries in the database table.

14. The computer-implemented method of claim 11, wherein providing the portion of the customer disinformation to the untrusted client device comprises:

determining and storing details regarding the untrusted client device, the request, the customer disinformation, or any combination thereof; and notifying the third party service of the details regarding the untrusted client device, the request, the customer disinformation, or any combination thereof.

15. The computer-implemented method of claim 11, wherein determining that the communicatively coupled client device is the untrusted client device comprises:

receiving authentication credentials from the communicatively coupled client device, wherein the authentication credentials are incorrect, incomplete, or have been compromised.

16. The computer-implemented method of claim 11, wherein the third party service comprises law enforcement services, government or regulatory agencies, credit card fraud prevention services, data monitoring services, affiliated companies, or a combination thereof.

17. The computer-implemented method of claim 11, wherein analyzing and modifying the potential customer disinformation comprises:

comparing the potential customer disinformation to the customer information stored in the customer database and modifying the potential customer disinformation based on the comparison; and applying one or more rules to the potential customer disinformation that selectively modify the potential customer disinformation to conform to an expected style or format.

18. The computer-implemented method of claim 11, wherein the trained AI component comprises a trained recurrent neural network (RNN), wherein the trained RNN is trained, based on the customer information, to generate the potential customer disinformation.

19. A non-transitory, computer-readable medium, having stored thereon instructions that, when executed by a processor system including at least one processor, cause the processor system to:

provide customer information stored in a customer database as input to a trained AI component;

receive potential customer disinformation as output from the trained AI component;

analyze and modify the potential customer disinformation to yield customer disinformation by applying one or more rules of the instructions to the potential customer disinformation that selectively modify one or more fields of the potential customer disinformation to conform to an expected style or format associated with the one or more fields; and provide a portion of the customer disinformation to an untrusted client device, a malicious website, a third party service, or any combination thereof.

\* \* \* \* \*